US010033182B2

(12) United States Patent
Izadian

(10) Patent No.: US 10,033,182 B2
(45) Date of Patent: Jul. 24, 2018

(54) BIDIRECTIONAL ELECTRICAL SIGNAL CONVERTER

(71) Applicant: Indiana University Research and Technology Corporation, Indianapolis, IN (US)

(72) Inventor: Afshin Izadian, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 146 days.

(21) Appl. No.: 14/906,879

(22) PCT Filed: Jul. 22, 2014

(86) PCT No.: PCT/US2014/047574
§ 371 (c)(1),
(2) Date: Jan. 21, 2016

(87) PCT Pub. No.: WO2015/013255
PCT Pub. Date: Jan. 29, 2015

(65) Prior Publication Data
US 2016/0181798 A1    Jun. 23, 2016

Related U.S. Application Data

(60) Provisional application No. 61/857,048, filed on Jul. 22, 2013.

(51) Int. Cl.
*H02J 1/00* (2006.01)
*H02M 7/797* (2006.01)
(Continued)

(52) U.S. Cl.
CPC ............... *H02J 1/00* (2013.01); *H02J 3/32* (2013.01); *H02J 7/0068* (2013.01); *H02M 7/04* (2013.01); *H02M 7/68* (2013.01); *H02M 7/797* (2013.01)

(58) Field of Classification Search
CPC .. H02J 1/00; H02J 7/0068; H02J 3/32; H02M 7/68; H02M 7/04; H02M 7/797
See application file for complete search history.

(56) References Cited

U.S. PATENT DOCUMENTS

| 4,396,818 A | 8/1983 | Kominami et al. |
| 6,069,804 A | 5/2000 | Ingman et al. |

(Continued)

FOREIGN PATENT DOCUMENTS

| JP | 2001037226 A | 2/2001 |
| JP | 2012239292 A | 12/2012 |

(Continued)

OTHER PUBLICATIONS

International Search Report and Written Opinion issued by the Korean Intellectual Property Office, dated Nov. 12, 2014, for International Application No. PCT/US2014/047574; 8 pages.

(Continued)

*Primary Examiner* — Kenneth B. Wells
(74) *Attorney, Agent, or Firm* — Faegre Baker Daniels LLP

(57) ABSTRACT

A bidirectional AC-to-DC and DC-to-AC circuit includes a first inductor-capacitor (LC) circuit connected to an AC power source, a transistor synchronized with the AC power source signal, a second LC circuit electrically connected to the synchronized transistor and the first inductor-capacitor circuit, a high-frequency switching transistor electrically connected to the second inductor-capacitor circuit and a direct current (DC) load, and a controller connected to the high-frequency switching transistor. The controller identifies an error between a measured DC output signal and a predetermined DC output signal that is applied to the DC (Continued)

load, and adjusts a duty cycle of a pulse width modulation (PWM) switching signal for the high-frequency transistor to reduce the identified error.

19 Claims, 3 Drawing Sheets

(51) Int. Cl.
  *H02J 3/32* (2006.01)
  *H02J 7/00* (2006.01)
  *H02M 7/04* (2006.01)
  *H02M 7/68* (2006.01)

(56) References Cited

U.S. PATENT DOCUMENTS

| | | | |
|---|---|---|---|
| 6,653,824 | B1 | 11/2003 | Whitlock |
| 6,842,353 | B2 * | 1/2005 | Yamada .......... H02M 1/36 323/271 |
| 7,551,462 | B2 * | 6/2009 | Uruno .......... H02M 3/158 363/21.02 |
| 7,791,909 | B2 | 9/2010 | Koo et al. |
| 8,242,758 | B2 * | 8/2012 | Choi .......... H02M 3/1584 323/272 |
| 2004/0027111 | A1 | 2/2004 | Lee |
| 2004/0037100 | A1 | 2/2004 | Orr et al. |
| 2004/0227496 | A1 * | 11/2004 | Hosotani .......... H02M 1/4208 323/282 |
| 2007/0171680 | A1 | 7/2007 | Perreault et al. |
| 2008/0258687 | A1 | 10/2008 | So et al. |
| 2010/0244802 | A1 | 9/2010 | Alexander |
| 2011/0205762 | A1 | 8/2011 | Pan et al. |
| 2011/0234187 | A1 | 9/2011 | Brown et al. |
| 2012/0104859 | A1 | 5/2012 | Nii et al. |
| 2012/0176090 | A1 | 7/2012 | Andrea et al. |
| 2012/0257429 | A1 | 10/2012 | Dong et al. |
| 2013/0147280 | A1 | 6/2013 | Oettinger |

FOREIGN PATENT DOCUMENTS

| | | |
|---|---|---|
| KR | 20040083186 A | 10/2004 |
| WO | WO 0221672 A1 | 3/2002 |

OTHER PUBLICATIONS

International Search Report and Written Opinion issued by the ISA/US, Commission for Patents, dated Dec. 30, 2014 for related Application No. PCT/US2014/056430; 14 pages.

Singh et al., A Review of Single-Phase Improved Power Quality AC-DC Converters, IEEE Transactions on Industrial Electronics, vol. 50, No. 5, Oct. 2003 (retrieved Nov. 18, 2014), Retrieved from Internet; <URL: http://www.eprint.iitd.ac.in/bitstream/2074/2025/1/singhrev2003.pdf>, pp. 962-981; 20 pages.

Ashari et al., A Single Phase Parallely Connected Uninterruptible Power Supply/Demand Side Management System, IEEE Transactions on Energy Conversion, vol. 15, No. 1, Mar. 2000 (retrieved Nov. 21, 2014), Retrieved from Internet: http://personal.its.ac.id/files/pub/3520-Ashari-EC00.pdf, pp. 97-102; 6 pages.

Bojrup et al., A Dual Purpose Battery Charger for Electric Vehicles, University paper (online) Lund Institute of Technology, 2014 (retrieved Nov. 21, 2014), Retrieved from Internet <URL: https: //web.archive.org/web/20040205061012/http:www.iea.lth.se/-ielper/charger/PESC98-paper.pdf>, pp. 1-6.

* cited by examiner

BIDIRECTIONAL ELECTRICAL SIGNAL CONVERTER

This application is a national phase of International Application No. PCT/US2014/047574, titled "Bidirectional Electrical Signal Converter," filed on Jul. 22, 2014, which claims the priority to U.S. Provisional Application No. 61/857,048, which is entitled "Bidirectional Electrical Signal Converter," and was filed on Jul. 22, 2013, the entire contents of both disclosures are hereby incorporated herein by reference in their entireties.

CLAIM OF PRIORITY

This application claims priority to U.S. Provisional Application No. 61/857,048, which is entitled "Bidirectional Electrical Signal Converter," and was filed on Jul. 22, 2013, the entire contents of which are hereby incorporated by reference herein.

TECHNICAL FIELD

The present description generally relates to electrical power conversion systems including systems that convert direct current (DC) signals to alternating current (AC) signals and convert AC signals to a DC signal in different operating modes.

BACKGROUND

Many devices that are operated with electrical power receive the power as either alternating current (AC) or direct current (DC) electrical signals. As is known in the art, electrical power is often delivered through a power grid as an AC signal using one or more AC phases. Electrical rectifier circuits and other devices including switched-mode power supplies are known to the art for the conversion of AC electrical signals to DC signals. Additionally, inverter circuits are known to the art for the conversion of a DC signal to an output AC signal.

Some electrical power systems include multiple modes of operation that use both AC and DC power signals. One example of such a system includes a battery in an energy generation system. For example, wind turbines generate electrical power as an AC waveform. The wind turbines supply some of the electrical power to an electrical utility grid in the form of AC electrical signals, but some of the electrical power is stored in batteries for later use. The electrical generation system includes rectifiers or other known systems to convert the AC signals received from the wind turbines to DC signals in order to charge the batteries. At another time, the batteries generate DC power that is converted back to AC through an inverter. The prior art system requires separate circuits control systems to regulate both the charging and discharging of the battery using both AC and DC power signals. While a battery energy storage system is one example of an electrical system that utilizes both AC and DC signals, many other electrical systems use AC and DC electrical signals in different operating modes. The complexity of separate electrical circuits that perform AC-to-DC and DC-to-AC conversion increases the costs and decreases the reliability of electrical systems that utilize both AC and DC electrical signals. Consequently, improvements to electrical circuits and systems for the conversion from AC to DC and from DC to AC electrical signals would be beneficial.

SUMMARY

In one embodiment a power converter that is configured to generate a direct current (DC) output signal from an alternating current (AC) input signal has been developed. The power converter includes a first inductor-capacitor circuit electrically connected to an alternating current (AC) power source, a first switching transistor electrically connected to the first inductor-capacitor circuit, a second inductor-capacitor circuit electrically connected to the first switching transistor and the first inductor-capacitor circuit, a first high-frequency switching transistor electrically connected to the second inductor-capacitor circuit and a direct current (DC) load, and a controller operatively connected to the first switching transistor and the first high-frequency switching transistor to operate the power converter in an AC-to-DC conversion mode. The controller is configured to operate the first switching transistor and the first high-frequency switching transistor to generate a DC output signal for the DC load from the AC power source, identify an error between a measurement of the DC output signal from the first high-frequency switching transistor and a predetermined DC output signal level for the DC load, and adjust a duty cycle of a pulse width modulation (PWM) switching signal to switch the high-frequency switching transistor at a predetermined frequency with the adjusted duty cycle to reduce the identified error in the DC output signal.

DETAILED DESCRIPTION

Figure 1:
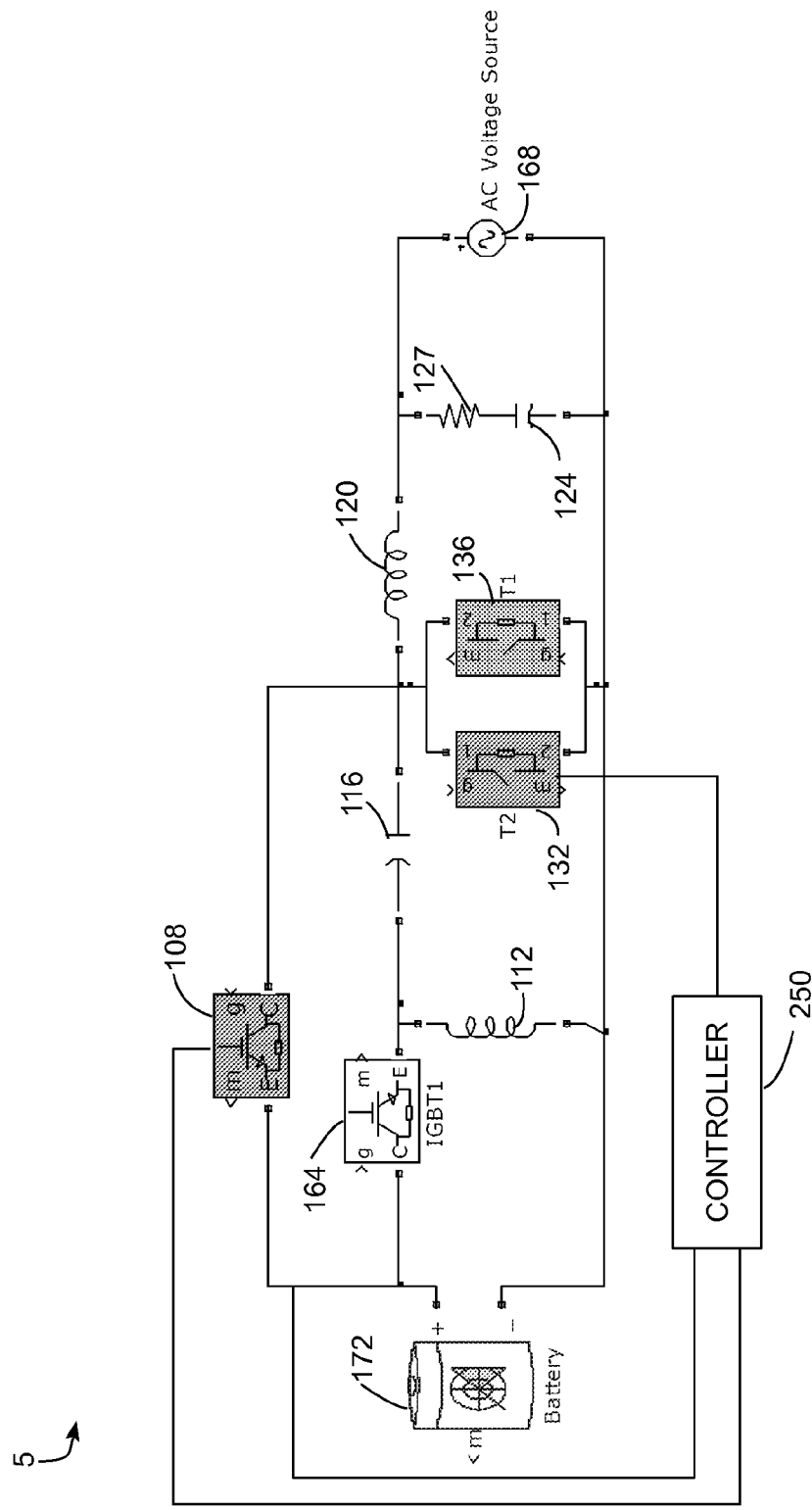
FIG. 1 is a circuit diagram of a bidirectional power converter that generates an AC output signal from a DC input signal in one operating mode and generates a DC output signal from an AC input signal in another operating mode.

For a general understanding of the environment for the system and method disclosed herein as well as the details for the system and method, reference is made to the drawings. In the drawings, like reference numerals have been used throughout to designate like elements.

FIG. 1 depicts a bidirectional power converter 5. The power converter 5 includes a first high-frequency switching transistor 108, a second high-frequency switching transistor 164, an inductor 112 and a capacitor 116. The inductor 112 and capacitor 116 form a first inductor-capacitor (LC) circuit. The converter 5 also includes synchronous switching transistors 132 and 136, an inductor 120 and a capacitor 124. The inductor 120 and capacitor 124 form a second LC circuit. The power converter 5 further includes a controller 250 that is configured to enable generation of a DC output signal from an AC input signal in one operating mode and generation of an AC output signal from a DC input signal in another operating mode.

In FIG. 1, the power converter 5 is electrically connected to a load resistance 127, an AC voltage source 168, and a battery 172. In the configuration of FIG. 1, the battery 172 is being charged with a DC electrical signal that the power converter 5 generates from an AC input signal from the AC voltage source 168. The battery 172 is an illustrative example of a DC load, and the power converter 5 is also suited to generate a DC output at a selected voltage level to drive different DC loads using the AC input source 168. In the configuration of FIG. 1, the high-frequency switching transistor 108 and the synchronized transistor 136 are switched to an "off" state to effectively stop the flow of electricity through these transistors. The synchronized transistor 132 switches on and off at the predetermined frequency of the input frequency of the AC voltage source 168 (e.g. 50 Hz or 60 Hz) in phase with the AC signal to enable the positive-voltage portions of the AC voltage waveform 168 to be captured by the converter circuit 5 for use in generating a DC output signal while rejecting the negative portions of the AC voltage signal. The high-frequency switching transistor 164 switches on and off at a predetermined frequency in a range of, for example, 2 KHz to 20 KHz. The controller 250 monitors a DC output signal from the power converter 5 that is applied to the battery 172 and applies a pulse-width modulation (PWM) signal to adjust a duty cycle of the high-frequency switching transistor 164 to maintain a predetermined voltage or current level of the output DC signal.

Figure 2:
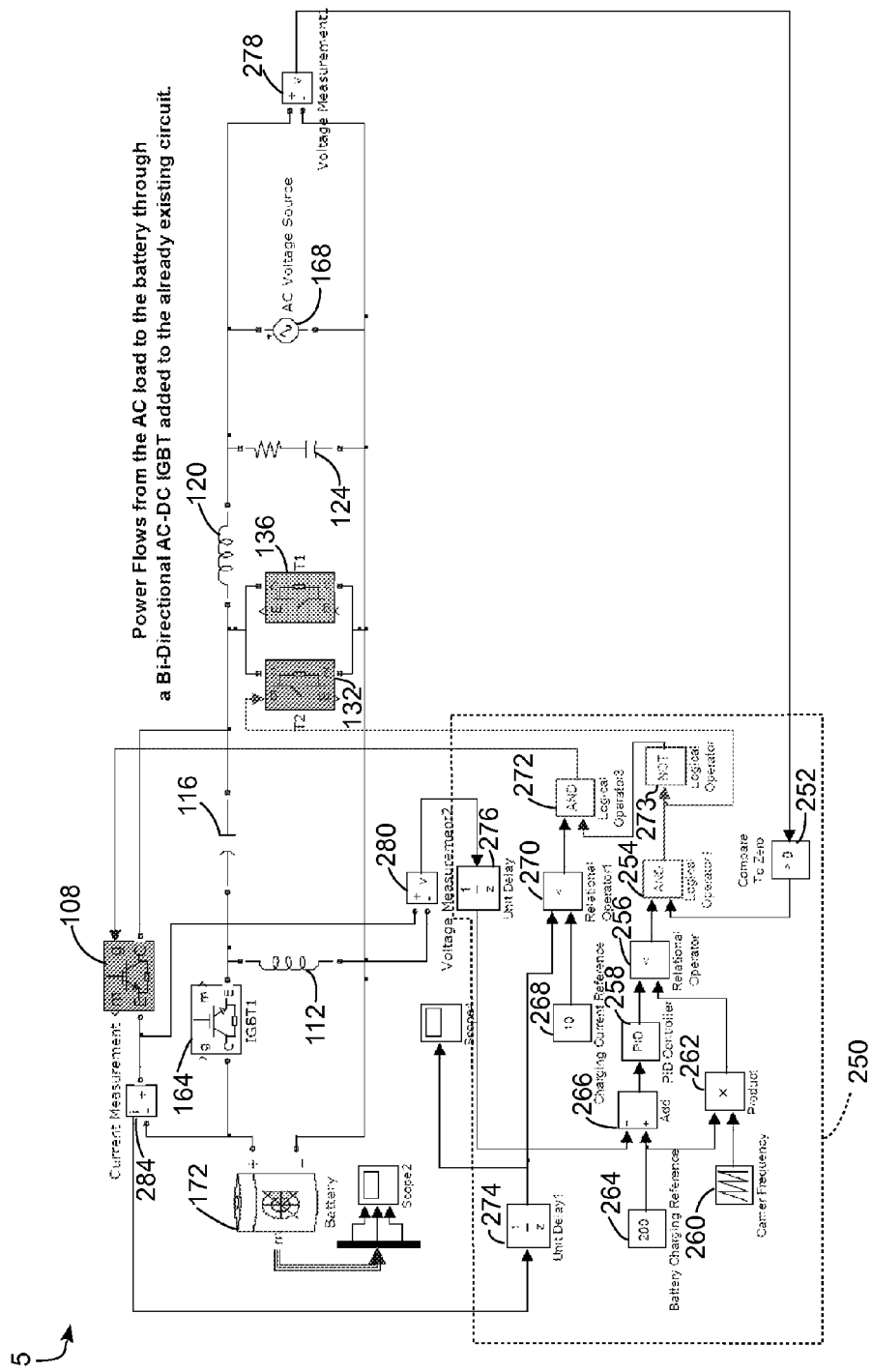
FIG. 2 is a circuit diagram of the bidirectional power converter of FIG. 1 depicting a controller for the bidirectional power converter in an AC-to-DC operating mode in more detail.

FIG. 2 depicts the power converter 5 of FIG. 1 and the controller 250 in more detail. The controller 250 is implemented using at least one digital microprocessor, microcontroller, application specific integrated circuit (ASIC), field programmable gate array (FPGA), digital signal processor (DSP) or other suitable digital logic devices. The functional elements of the controller 250 that are depicted in FIG. 2 can be implemented using a combination of hardware and software components. During operation, the controller 250 receives signals from one or more sensors including a voltage measurement sensor 278 that measures the time-varying voltage level of the AC voltage source 168, a voltage measurement sensor 280 that measures a voltage differential between an output of the high-frequency switching transistor 108 and the inductor 112, and a current measurement sensor 284 that measures a level of DC current that flows into the battery 172. In an embodiment of the circuit 5 where the controller 250 is a digital control device, the analog measurement devices such as the current measurement sensor 284 and voltage measurement circuits 278 and 280 incorporate or are connected to analog to digital converters (ADCs) that generate digital output signals that are suitable for input to the controller 250.

The controller 250 includes a memory that stores a predetermined DC voltage signal reference 264, such as a predetermined voltage level for the DC signal that charges the battery 172 in FIG. 2. In some embodiments, the DC voltage signal reference 264 is a fixed voltage value (e.g. 200V) that is selected to drive a DC load with the predetermined DC voltage. In other embodiments, the DC voltage signal reference 264 implements control logic to adjust the DC voltage signal level over time due to changes in the load 172. For example, in the illustrative example of FIG. 2, the DC voltage signal reference 264 optionally generates a curve of DC output voltage over time to adjust the level of DC voltage over time during the charging process for the battery 172.

In the power converter circuit 5, a signal generator module 260 generates a sawtooth signal at the predetermined switching frequency of the high-frequency switching transistor 108, such as the 2 KHz to 20 KHz frequency range described above. A multiplication module 262 generates a scaled output of the present time output of the sawtooth signal multiplied by the reference voltage 264. The reference voltage 264 is added to a time-delayed measured voltage level from a time delay module 276 that receives the measured voltage level from the voltage sensor 280. A difference module 266 subtracts the measured voltage level to the reference voltage level as input to a proportional, integral, differential (PID) control module 258. The difference module 266 generates a feedback error signal for the PID control module 258 corresponding to the measured signal subtracted from the reference signal.

The PID control module 258 sets a control point threshold to adjust the duty cycle of the first high-frequency switching transistor 108 based on the measured voltage level of the DC circuit and the predetermined set level. For example, in one configuration the PID control module 258 raises the control point if the measured voltage drops below the predetermined reference voltage level and lowers the control point if the measured voltage rises above the predetermined reference voltage level. While FIG. 2 depicts a PID control module 258, alternative embodiments include different control logic including, but not limited to, PI, adaptive, self-tuning, variable structure, sliding mode, optimal, robust, model predictive, and any other suitable control logic.

In the controller 250, a relative comparison module 256 generates a logical "1" when the output of the multiplier 262 corresponding to the present-time value of the sawtooth signal generator 260 is less than the control point from the PID control module 258. The PID control module 258 increases the value of the control signal to increase the duty cycle of the PWM control signal for the first high frequency transistor 108 and decreases the value of the control signal to decrease the duty cycle of the PWM control signal for the first high frequency transistor 108. The output of the relative comparison module 256 and an output of a comparison module 252 form inputs to a logical NAND module that comprises the AND module 254 and NOT module 273 in the embodiment of FIG. 2. The comparison module 252 asserts a logical "1" when the output signal from the AC voltage source 168 is a positive voltage. The logical NAND module asserts "1" only when the respective outputs of the relative comparison module 256 and the comparison module 252 are logical "1" and "0", "0" and "1", or "0" and "0". Thus, the NAND module asserts "0" when both the relative comparison module 256 and comparison module 252 assert a logical "1". A logic table for the NAND module and the corresponding switching states of the first high-frequency transistor 108 and the switching transistor 132 is set forth below in table 1:

TABLE 1

Output of NAND module for first high-frequency transistor 108

| Comparator 256 (Inverted Signal from Controller) | Comparator 252 (Positive or Negative AC voltage) | NAND Output |
|---|---|---|
| 0 | 0 | 1 |
| 0 | 1 | 1 |
| 1 | 0 | 1 |
| 1 | 1 | 0 |

In the NAND module, the comparator 256 generates an inverted output of a logical "1" when the scaled sawtooth function output 262 exceeds the control point of the PID controller 258 to switch off the high-frequency transistor 108 and an output of "0" corresponding to a PID control signal to switch on the high-frequency transistor 108. In the circuit configuration of FIG. 2, the NAND module also asserts "1" to switch the first high-frequency transistor 108 on when the AC voltage source 168 is positive or negative (output of the comparator 252 is "0" or "1"), and the output of the comparator 256 is "0", which corresponds to a PID control output that switches on the high-frequency transistor 108. The first switching transistor 132 is controlled by the output of the AND gate 254 and is the logical inverse of the output of the NAND module. Thus, whenever the NAND module output is "1" to switch on the first high-frequency switching transistor 108, the output of the AND module 254 is "0" to switch off the first switching transistor 132. The AND module 272 generates a logical "1" to activate the first high-frequency switching transistor 108 or a logical "0" to deactivate the first high-frequency switching transistor 108 when the NAND module asserts "1" and when the measured current level to the battery 172 is below a predetermined maximum reference current level, as described in more detail below.

The controller 250 also stores a predetermined maximum DC-load current reference 268 in the memory. In FIG. 2 the battery charging reference voltage is 200V and the battery charging current level reference is 10 A. The controller 250 adjusts the duty cycle of the first high-frequency switching transistor 108 to maintain a DC charging signal at the reference voltage level. If the current applied to the battery 172 exceeds the predetermined current level, then the controller 250 switches off the first high-frequency switching transistor 108 without regard to the output of the PID control module 258 and the NAND module described above. In FIG. 2, a time delay module 274 provides a time-delayed digital measurement from the current measurement sensor 284, the relational operator module 270 generates a logical "1" when the measured current is below the maximum current reference 268. The AND module 272 generates a "0" to switch off the first high-frequency switching transistor 108 whenever the measured current exceeds the maximum current reference 268, and generates a "0" or a "1" based on the input from the NAND module when the measured current level is below the maximum current reference 268.

The controller 250 generates a signal to switch the synchronous transistor 132 using an input from a voltage sensor 278 and the comparison module 252 that generates a logical "1" when the AC output voltage is positive. Additionally, an output of the relative comparison module 256 and the comparison module 252 are inputs to an AND module 254 that asserts a high signal to activate the synchronous transistor 132 only when the output of the AC signal generator 168 is positive and when the current value of the sawtooth signal is below the control threshold that is set by the PID control module 258.

The power converter circuits of FIG. 1 and FIG. 2 are configured to generate a DC output signal from the positive portions of an AC input signal waveform. In another configuration, the high-frequency switching transistor is electrically connected to a negative terminal of the DC load 172 and the logic of the comparison module 252 is reversed to enable the generation of the DC signal from the negative portion of the AC input signal.

Figure 3:
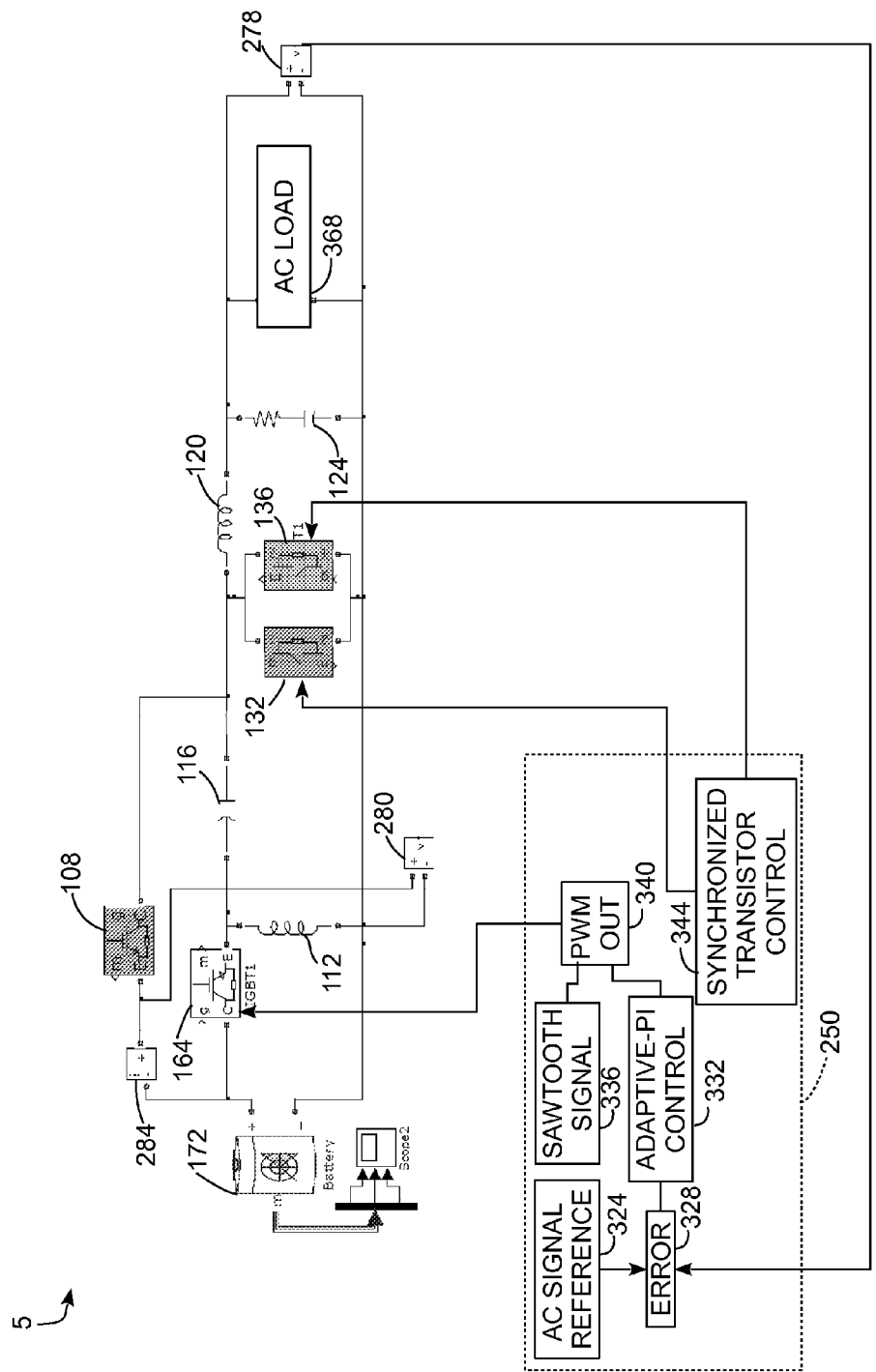
FIG. 3 is a circuit diagram of the bidirectional power converter of FIG. 1 and FIG. 2 depicting the controller for the bidirectional power converter in a DC-to-AC operating mode in more detail.

As described above, the power converter 5 of FIG. 1 and FIG. 2 is a bidirectional power converter that performs two operating modes with the AC-to-DC conversion mode described above and a DC-to-AC conversion mode. In the DC-to-AC conversion mode, the circuit 5 generates an AC output signal from a DC power source. FIG. 3 depicts another configuration of the power converter 5 from FIG. 1 and FIG. 2 in the DC-to-AC operating mode. In FIG. 3, the DC power source is depicted as the battery 172 when the battery is operating in a discharge mode and the AC voltage source 168 is replaced by an AC load 368 that receives an AC power output from the power converter circuit 5. The controller 250 implements a synchronized transistor control 344 that generates a control signal to operate the synchronous switching transistors 132 and 136 at a predetermined frequency that corresponds to the frequency of the AC output signal (e.g. 50 Hz or 60 Hz). During operation, when one of the switching transistors 132 or 136 is switched on, the other switching transistor 132 or 136 is switched off. In the DC-to-AC operating mode, the controller 250 switches the synchronized switching transistors 132 and 136 on and off at the output frequency of the AC output signal independently from the operation of the second high-frequency transistor 164. The controller 250 switches the second high-frequency transistor 164 at a higher frequency than the output signal (e.g. in a frequency range of 2 KHz to 20 KHz) with varying duty cycles levels to adjust the output level of the output signal to conform to a predetermined output AC waveform. Examples of AC waveforms include sinusoidal, triangular, square-wave, and any other suitable AC output signal waveform. During the DC-to-AC conversion mode, the first high-frequency transistor 108 remains switched off.

The controller 250 implements a control process to adjust a duty cycle of the second high-frequency switching transistor 164. An AC reference signal generator 324 produces a digital representation of the AC output signal waveform for the AC load 368. The controller 250 also measures the actual AC output signal with reference to the voltage at the AC output from the voltage sensor 278. The error module 328 produces an error signal that corresponds to any difference between the reference AC signal generator waveform 324 and the measured AC output from the voltage sensor 278. The control process adjusts the duty cycle of the second high-frequency transistor 164 to reduce or eliminate errors between the measured output signal from the circuit 5 and the predetermined waveform for the AC output signal. In the embodiment of FIG. 3, the controller 250 implements a hybrid control strategy that includes an adaptive controller and a proportional-integral (PI) controller 332, but alternative control strategies for the controller 250 can be used in alternative embodiments. In FIG. 3, the adaptive-PI controller 332 generates a control signal at an output level that is compared to an output sawtooth waveform from a sawtooth signal generator 336. The adaptive-PI controller 332 increases the control level output to increase the duty cycle of the second high-frequency switching transistor 164 and decreases the control level output to decrease the duty cycle of the second high-frequency switching transistor 164. The PWM output module 340 switches the second high-frequency transistor 164 on when the output of the sawtooth signal 336 is less than the control signal level from the adaptive-PI controller 332 and switches the second high-frequency transistor 164 off when the output of the sawtooth signal 336 is greater than the control signal level from the adaptive-PI controller 332.

While the embodiments have been illustrated and described in detail in the drawings and foregoing description, the same should be considered as illustrative and not restrictive in character. The reader should understand that only the preferred embodiments have been presented and that all changes, modifications and further applications that come within the spirit of the invention are desired to be protected as set forth in the following claims.

What is claimed is:

1. A power converter comprising:
    a first inductor-capacitor circuit electrically connected to an alternating current (AC) power source;
    a first switching transistor electrically connected to the first inductor-capacitor circuit;
    a second inductor-capacitor circuit electrically connected to the first switching transistor and the first inductor-capacitor circuit;
    a first high-frequency switching transistor electrically connected to the second inductor-capacitor circuit and a direct current (DC) load; and
    a controller operatively connected to the first switching transistor and the first high-frequency switching transistor to operate the power converter in an AC-to-DC conversion mode, the controller being configured to:
    operate the first switching transistor and the first high-frequency switching transistor to generate a DC output signal for the DC load from the AC power source;
    identify an error between a measurement of the DC output signal from the first high-frequency switching transistor and a predetermined DC output signal level for the DC load; and
    adjust a duty cycle of a pulse width modulation (PWM) switching signal with reference to the identified error and a proportional-integral-differential (PID) controller to switch the high-frequency switching transistor at a predetermined frequency with the adjusted duty cycle to reduce the identified error in the DC output signal.

2. The power converter of claim 1, the controller being further configured to:
    switch off the first switching transistor when the first high-frequency switching transistor is switched on.

3. The power converter of claim 1 further comprising:
    a voltage sensor operatively connected to an output of the AC power source and configured to identify a level of AC voltage from the AC power source; and
    the controller being operatively connected to the first switching transistor and the voltage sensor, the controller being further configured to:
        switch off the first switching transistor in response to a negative level of AC voltage from the AC power source.

4. The power converter of claim 1 further comprising:
    a current measurement sensor operatively connected to an output of the power converter and configured to identify a level of DC current applied to the DC load; and
    the controller being operatively connected to the current measurement sensor and configured to:
        switch off the high-frequency transistor in response to the level of DC current applied to the DC load exceeding a predetermined maximum level.

5. The power converter of claim 1, wherein the power converter is configured to generate the DC output at a selected voltage level to drive different DC loads using the AC input source.

6. The power converter of claim 4 further comprising an analog to digital converter (ADC) operatively connected to the current measurement sensor and the controller.

7. The power converter of claim 1, wherein the controller comprises a signal generator module configured to generate a sawtooth signal.

8. The power converter of claim 1, wherein the controller comprises a difference module that subtracts a measured voltage from a reference voltage.

9. The power converter of claim 8, wherein the controller comprises a proportional, integral, differential (PID) control module operatively connected to the difference module.

10. The power converter of claim 9, wherein the PID control module sets a control point threshold to adjust the duty cycle of the PWM switching signal with reference to the identified error and the proportional-integral-differential (PID) controller.

11. The power converter of claim 8, wherein the controller comprises a control module having control logic selected from the group consisting of PI, adaptive, self-tuning, variable structure, sliding mode, optimal, robust, and model predictive control logic.

12. The power converter of claim 1, the controller being further configured to adjust the duty cycle of the PWM switching signal with reference to the identified error and an output of a control module having control logic selected from the group consisting of PI, adaptive, self-tuning, variable structure, sliding mode, optimal, robust, and model predictive control logic.

13. A power converter comprising:
    a first inductor-capacitor circuit electrically connected to an alternating current (AC) power source;
    a first switching transistor electrically connected to the first inductor-capacitor circuit;
    a second inductor-capacitor circuit electrically connected to the first switching transistor and the first inductor-capacitor circuit;
    a first high-frequency switching transistor electrically connected to the second inductor-capacitor circuit and a direct current (DC) load;
    a controller operatively connected to the first switching transistor and the first high-frequency switching transistor to operate the power converter in an AC-to-DC conversion mode, the controller being configured to:
    operate the first switching transistor and the first high-frequency switching transistor to generate a DC output signal for the DC load from the AC power source;
    identify an error between a measurement of the DC output signal from the first high-frequency switching transistor and a predetermined DC output signal level for the DC load; and
    adjust a duty cycle of a pulse width modulation (PWM) switching signal to switch the high-frequency switching transistor at a predetermined frequency with the adjusted duty cycle to reduce the identified error in the DC output signal;
    a voltage sensor operatively connected to an output of the AC power source and configured to identify a level of AC voltage from the AC power source; and
    the controller being operatively connected to the first switching transistor and the voltage sensor, the controller being further configured to switch off the first switching transistor in response to a positive level of AC voltage from the AC power source.

14. The power converter of claim 13 further comprising an analog to digital converter (ADC) operatively connected to the voltage sensor and the controller.

15. A power converter comprising:
    a first inductor-capacitor circuit electrically connected to an alternating current (AC) power source;
    a first switching transistor electrically connected to the first inductor-capacitor circuit;
    a second inductor-capacitor circuit electrically connected to the first switching transistor and the first inductor-capacitor circuit;

a first high-frequency switching transistor electrically connected to the second inductor-capacitor circuit and a direct current (DC) load;

a controller operatively connected to the first switching transistor and the first high-frequency switching transistor to operate the power converter in an AC-to-DC conversion mode, the controller being configured to:

operate the first switching transistor and the first high-frequency switching transistor to generate a DC output signal for the DC load from the AC power source;

identify an error between a measurement of the DC output signal from the first high-frequency switching transistor and a predetermined DC output signal level for the DC load; and adjust a duty cycle of a pulse width modulation (PWM) switching signal to switch the high-frequency switching transistor at a predetermined frequency with the adjusted duty cycle to reduce the identified error in the DC output signal;

a second switching transistor electrically connected to the first inductor-capacitor circuit and configured to switch at predetermined switching frequency corresponding to a frequency of an AC output signal for an AC load;

a second high-frequency switching transistor electrically connected to the second inductor-capacitor circuit and a DC power source; and the controller being operatively connected to the second switching transistor and the second high-frequency switching transistor to operate the power converter in a DC-to-AC conversion mode to generate the AC output signal for the AC load using the DC power source, the controller being further configured to:

generate a control signal at the predetermined switching frequency to operate the first switching transistor and the second switching transistor, the first switching transistor being switched off when the second switching transistor is switched on, and the first switching transistor being switched off when the second switching transistor is switched on;

identify another error between the AC output signal that is generated for the AC load and a predetermined AC output signal; and adjust a duty cycle of a pulse width modulation (PWM) switching signal for the second high-frequency switching transistor to reduce the other error identified in the AC output signal.

16. The power converter of claim 15, the DC load being a battery that receives charge during the AC-to-DC conversion mode and the DC power source being the battery that discharges during the DC-to-AC conversion mode.

17. The power converter of claim 15, wherein the controller is configured to switch the second high-frequency switching transistor at a higher frequency than the output signal.

18. The power converter of claim 17, wherein the controller is configured to switch the second high-frequency switching transistor with varying duty cycles.

19. The power converter of claim 18, wherein the controller is configured to adjust an output level of the output signal to conform to the predetermined output AC waveform.

* * * * *